Jan. 3, 1967  A. STENGER, JR., ET AL  3,296,494
VOLTAGE RESPONSIVE DEVICES AND METHODS OF VOLTAGE DETECTION
Filed June 24, 1963  5 Sheets-Sheet 1

INVENTORS
ANDREW STENGER JR.
JAMES S. HALL

BY
ATTORNEY

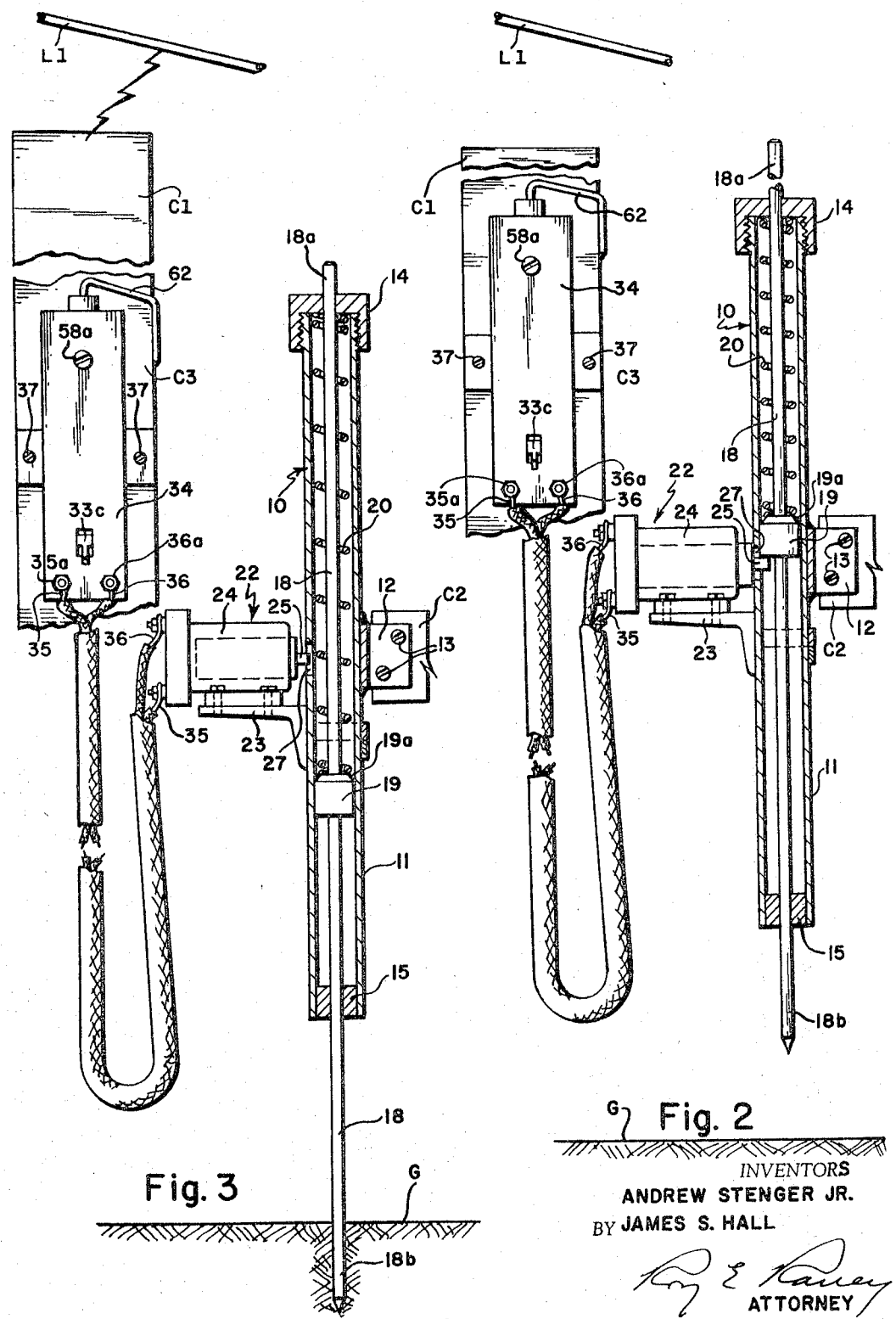

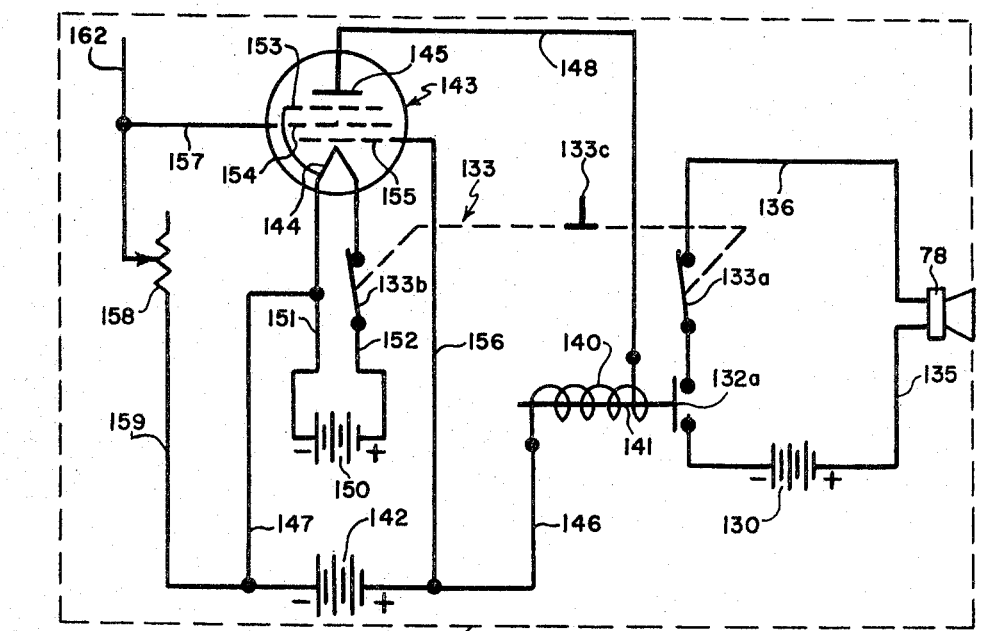
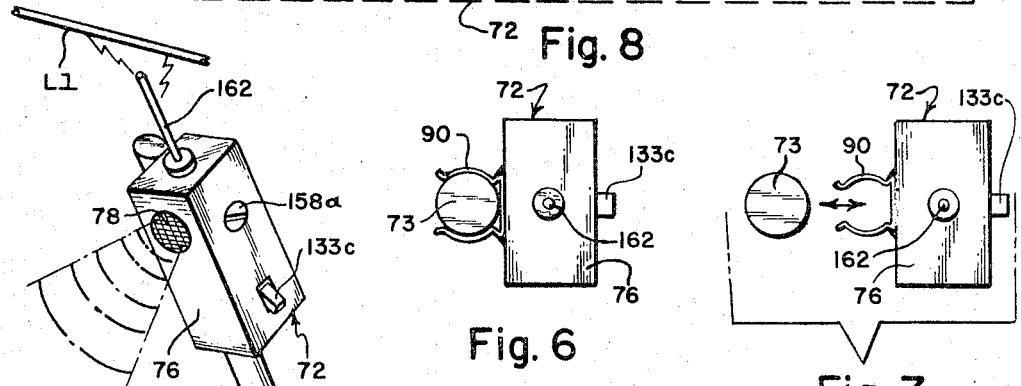

INVENTORS
ANDREW STENGER JR.
JAMES S. HALL
BY
ATTORNEY

United States Patent Office 3,296,494
Patented Jan. 3, 1967

3,296,494
VOLTAGE RESPONSIVE DEVICES AND
METHODS OF VOLTAGE DETECTION
Andrew Stenger, Jr., 6443 41st Ave. N., St. Petersburg, Fla. 33708, and James S. Hall, 7923 Bogie Ave. N., St. Petersburg, Fla. 33710
Filed June 24, 1963, Ser. No. 290,124
7 Claims. (Cl. 317—17)

The present invention relates to apparatus for sensing electric current potentials in bodies without contacting the bodies and to methods of employing such apparatus for safety and protective systems. This application is a continuation in part of our copending application Serial No. 173,918 filed February 19, 1962, now abandoned.

It is well known that many persons are killed or injured by contacting directly or indirectly electric lines or conductors of high voltage which they would otherwise avoid if aware of the voltage condition. Persons subject to these hazards are repairmen for electric power lines or electrical equipment and operators or workers on and around machines or equipment which may be inadvertently moved into contact with high voltage carrying lines resulting in electrocution of persons contacting the machine and the ground. It is one object of this invention therefore to provide a device which can be conveniently carried on a person or on a machine and which is highly sensitive to magnetic fields so that it responds to the presence of a magnetic flux field of a charged member to sound an alarm, or to operate a grounding device where used on a machine.

Another object of the invention is the provision of a device which may be carried on a vehicle or machine, such as a crane, which is apt to inadvertently contact high voltage lines, and which device responds to the presence of magnetic flux fields surrounding current conductors to automatically ground the vehicle and thereby prevent electrocution of persons on or around the vehicle.

A still further object of the invention is the provision of a grounding device for a vehicle or machine comprising a current conducting shaft adapted to be supported on the vehicle normally out of engagement with the ground to permit free movement of the vehicle and which is driven into the ground to establish good electrical connection between the vehicle and the ground when the vehicle or any part thereof enters a magnetic flux field such as that surrounding high voltage lines.

Yet another object of the invention is the provision of an alarm device responsive to the presence of a magnetic flux field which establishes a momentary testing of the alarm when the device is initially placed into operation and which alarm will be given in the event of failure of a critical component of the flux sensing device.

Another object of the invention is the provision of portable apparatus or instrument which indicates the presence of a magnetic field which is so sensitive that it can detect the presence of wires within a wall, for example, if any appreciable current potential is present in the wires. The apparatus may be used advantageously to determine whether or not a circuit is established in twelve or twenty-four volt thermostatic control wires or if a circuit is established in telephone wires.

Also, it is desirable to test the electrical insulation qualities of various members subjected to relatively high voltage potentials, such as the handles on disconnect devices for high voltage power lines and power line insulators. Known devices for testing these handles and insualtors are expensive and relatively cumbersome to operate. Another object of the invention is the provision of a method of testing the insulating qualities of bodies which comprise connecting a current conductor part of the body to a high voltage source, placing a metallic grounded screen around the body and in a plane extending radially through the body at a point adjacent to the current conducting part, and then moving the current sensing part of an instrument which is responsive to relatively minute magnetic fields along the body, preferably in spaced relation thereto, to determine the presence of a potential in the insulation portion.

It is customary to protect power transformers and the like against overloading by the provision of current responsive circuit breakers subjected to the line current. A disadvantage of such type protection is the fact that when the insulating quality of the oil in the transformers breaks down the current discharged will be too sudden for operation of the circuit breakers. A still further object of the invention therefore is the provision of a protective system for power transformers and the like comprising a device sensitive to slight pulsating voltages in the casing of a transformer or the like and operative to open the transformer circuit in the event a slight voltage appears in the casing. Thus, the protective device operates before any appreciable current is present and consequently severe damage to the transformer is prevented.

Other objects and advantages of the invention will be apparent from the following description of preferred forms of embodiments thereof, reference being made to the accompanying drawings wherein FIG. 1 is a schematic showing of a crane having an automatic grounding device thereon embodying the invention;

FIG. 2 is a fragmentary sectional view of the automatic grounding device on the crane, the device being shown in its non-grounding position;

FIG. 3 is a view similar to FIG. 2 but showing the grounding device in its grounding position;

FIG. 5 is a perspective view of a portable high voltage alarm which can be carried on a person or a pole or the like;

FIGS. 6 and 7 are top views of the high voltage alarm device shown in FIG. 5 illustrating the adaptation of the device to a pole;

FIG. 8 is a schematic wiring diagram of the alarm device shown in FIGS. 5–7;

Figure 1:
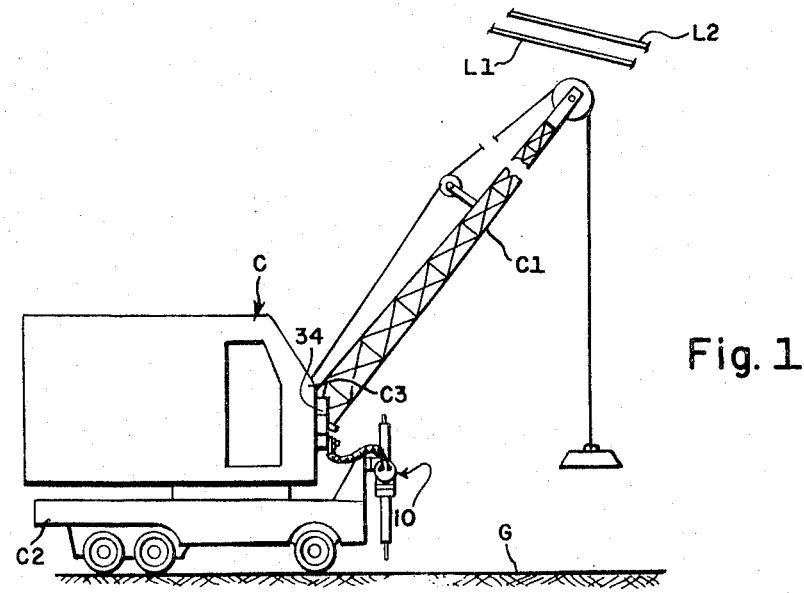

Referring to the embodiment of the invention shown in FIGS. 1 through 4, an automatic grounding device 10 is shown attached to the frame of a crane C, which crane includes a boom C1. It is common knowledge that with equipment such as cranes, earth moving machines, and various other types of machines, the operators are apt to inadvertently move the machine or its working parts into engagement with conductors of high voltage, resulting in injury to or electrocution of personnel becoming grounded while in contact with the vehicle or machine. According to the present invention, the device 10 automatically establishes a grounding connection between the body of the vehicle and ground in the event boom C1, or any other part of the crane, approaches a high voltage conductor so that electrocution of personnel about the vehicle is prevented, should contact finally be made with the conductor.

In the form of the invention shown, device 10 comprises a metallic cylinder 11 having a metal bracket 12 attached thereto by which the member is attached to a frame member C2 and cylinder 11. The cylinder is supported on the crane in a vertical position, and the upper end thereof is closed by a cap 14 threaded thereon, and the lower end of the cylinder has a bushing 15 press fitted therein. A grounding rod or shaft 18 is slideably positioned in cylinder 11 with the upper end 18a thereof projecting through cap 14 and the lower end 18b projecting through bushing 15. Intermediate the ends of rod 18 is a shoulder portion 19 which may comprise a collar attached to the rod as by brazing, and a metal coil spring 20 is interposed between the shoulder and cap 14 to continually urge the rod downwardly with considerable force so as to drive the rod into the ground G when the rod is released from the position shown in FIG. 2, as is described more fully hereinafter. Preferably, the lower end of rod 18 is pointed so that the force of spring 20 can more readily drive the rod into the ground.

Rod 18 is normally retained in cylinder 11 with the lower end withdrawn from the ground, as shown in FIG. 2 by a solenoid operated latch mechanism 22 which is supported on cylinder 11 by a bracket 23 welded or brazed thereto. Bracket 23 supports a conventional solenoid 24 which includes an armature 25 normally spring biased outwardly or to the right, as viewed in FIGS. 2 and 3, and which projects through an opening 27 formed in one side of cylinder 11 and into the path of shoulder 19. The upper portion of shoulder 19 is beveled as at 19a so as to cam move the armature outwardly as rod 18 is raised upwardly from its grounding position, shown in FIG. 3, to the position shown in FIG. 2, so that rod 18 is automatically latched in its raised position as shown. When solenoid 24 is energized armature 25 is drawn to the left which removes it from beneath shoulder 19 thereby permitting spring 20 to drive rod 18 downwardly and into ground G as shown in FIG. 3 When rod 18 is in contact with the ground as shown in FIG. 3, a good electrical connection is established between frame member C2 of crane C and rod 18 through the walls of cylinder 11, and spring 20.

Figure 4:
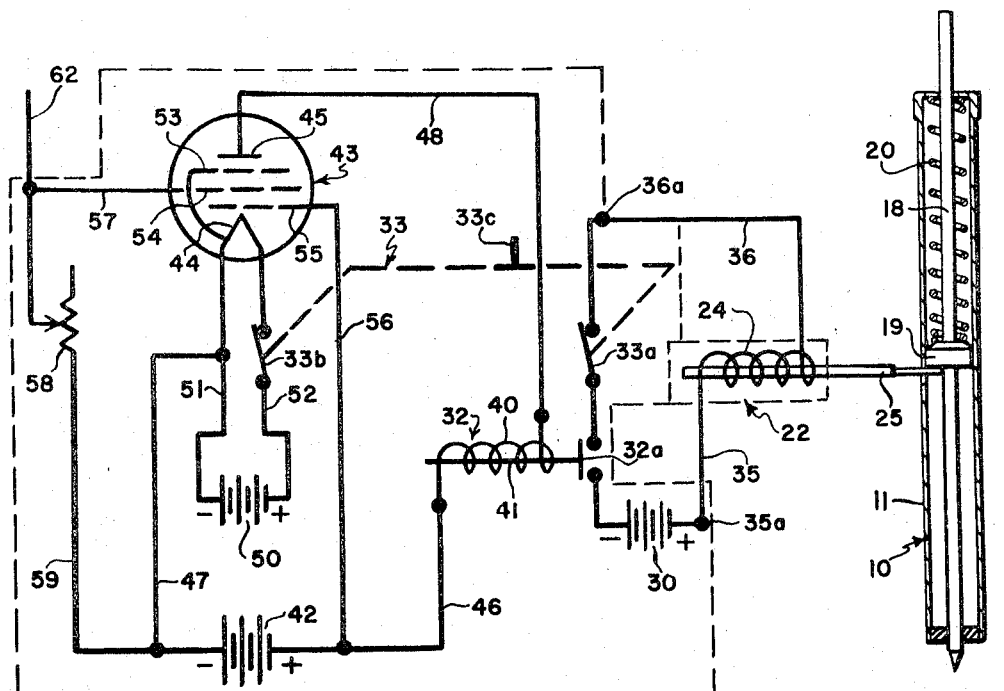
FIG. 4 is a schematic wiring diagram of the control for the grounding device.

Solenoid 24 is energized by a battery 30 through a series circuit including a relay switch contact 32a of a solenoid relay 32, switch contact 33a of an on-off double switch 33, as shown in FIG. 4. Battery 30, relay 32, switch contact 33a, as well as certain control elements for the relay, described more fully hereinafter, are preferably mounted in a suitable enclosed housing 34 which is attached to a metal member C3 of the crane body by screws 37. Opposite terminals of solenoid 24 are connected with battery 30 and switches 32a and 33a by wires 35 and 36 attached to suitable terminals 35a and 36a projecting from housing 34.

Relay 32 includes a solenoid 40 and an armature 41 to which switch contact 32a is attached and which is normally urged in an open switch position to break the circuit through wires 35 and 36 when the solenoid 40 is deenergized, and when this solenoid is energized switch 32a is closed by operation of the armature to complete the circuit for latch solenoids 24 to release rod 18.

Solenoid 40 is energized by a battery 42 through a circuit including an electron tube 43 having a cathode 44 and a plate 45. One terminal of solenoid 40 is connected by wire 46 to the positive terminal of battery 42 and cathode 44 is connected to the negative terminal of the battery by wire 47. Plate 45 is connected to the other terminal of solenoid 40 by wire 48. Battery 42 is a 67½ v. "B" battery and tube 43 is a type 1-T-4. The cathode heater circuit includes a 1½ volt battery 50 with the negative terminal connected by a wire 52 and the second switch contact 33b of the on-off double switch 33. Switch 33 includes a toggle handle 33c which projects from housing 34 for ready access and which operates to open and close switch contacts 33a and 33b simultaneously for making and breaking the circuits of solenoid 24 and cathode 44.

The flow of current through tube 43 is controlled by grids 53, 54, and 55, grid 53 being connected to the cathode and grid 55 being connected to the positive terminal of battery 42 by wire 56. Grid 54 is connected to the negative terminal of battery 42 by a circuit comprising wire 57, variable resistor 58, and wire 59. A sensor or collector element 62, which may be a section of suitable wire, is connected with wire 57 at a common terminal and projects from housing 34 and is soldered to body member C3. It will be understood that when switch control 33b is closed and current is flowing through the heater circuits for the cathode, current will flow in the circuit for solenoid 40 and maintain contact 32a open. In the event collector 62 is subjected to a pulsating magnetic flux field of a given density, a negative bias is impressed on grid 54 to block the passage of current through the tube. The density of the flux field necessary to impress this blocking bias on the grid may be adjusted by variable resistor 58 which includes an adjusting knob 58a projecting from the housing 34. In the form shown, this resistor has a range of from 0 to 35 megohms. By increasing the resitsance the sensitivity of the circuit to a magnetic flux can be increased and to provide convenient adjustment of this sensitivity, the knob 58a is provided to permit adjustment of the resistor as conditions require.

It will be seen that when collector 62 is subjected to a magnetic flux field a negative bias is produced on grid 54, thereby cutting off the flow of current through the circuit for solenoid 40, which will cause the solenoid to release armature 41 and close switch 32a to energize solenoid 24 and release rod 18, thereby grounding the vehicle frame. The device shown is of such sensitivity that it responds to a magnetic flux in the body of the crane induced by any metallic part of the crane, particularly the boom, approaching dangerously high voltage lines, such as indicated at L1 and L2 to actuate the grounding rod operating mechanism 10. This operation is illustrated in FIGS. 1 to 3 wherein the crane boom C' approaches high tension lines L1 and L2. In the event the crane then contacts the high voltage line, the crane is grounded so as to prevent passage of electricity through a person on the ground and in contact with any part of the crane.

In the form of the invention shown in FIGS. 5, 6, 7, and 8, an alarm device 72 is provided which can be conveniently carried on a person or which may be attached to a sensing pole, such as that shown at 73, and which will sound an alarm when brought within a magnetic field surrounding a high voltage power line. The alarm comprises a suitable housing 76 in which a horn or other suitable electrically operated signal maker 78 is mounted and which is energized by a battery 130 through a circuit including a relay switch 132a and a contact 133a of a double contact on-off switch 133. The circuit and components for the alarm device are similar to that for the automatic grounding device 10, the only differences being that horn 78 replaces latch solenoid 24 and a collector 162 replaces collector 62. To avoid unnecessary repetition of the components, like parts are designated by the same reference characters but raised by 100.

It will be seen that when collector 162 is brought within a magnetic field, the current flow through solenoid 140 will be terminated causing contactor 132a to close the circuit for horn 78 which will then emit noise and warm the person or persons involved of the presence of a high voltage.

It is to be noted that when switch 133 is first moved to the "on" position, the horn circuit will be closed until the cathode of tube 143 is heated to operating temperature, after which the horn circuit is broken by energization of solenoid 140; thus, the device is tested for operativeness each time it is used. Furthermore, in the event there is a failure of the tube, the circuit to solenoid 140 will be broken and switch 132a will close and cause operation of the horn, thus the device "fails safe."

This situation is likewise true of the grounding device 10 and its control system.

Device 72 can be either carried on a person, or as shown in FIGS. 5, 6, and 7, it can be detachably connected to a fuse pole 73 by a spring clip 90 and the pole can be used to bring the device adjacent to conductors in which it is desired to determine whether or not a dangerous voltage condition exists.

Figure 9:
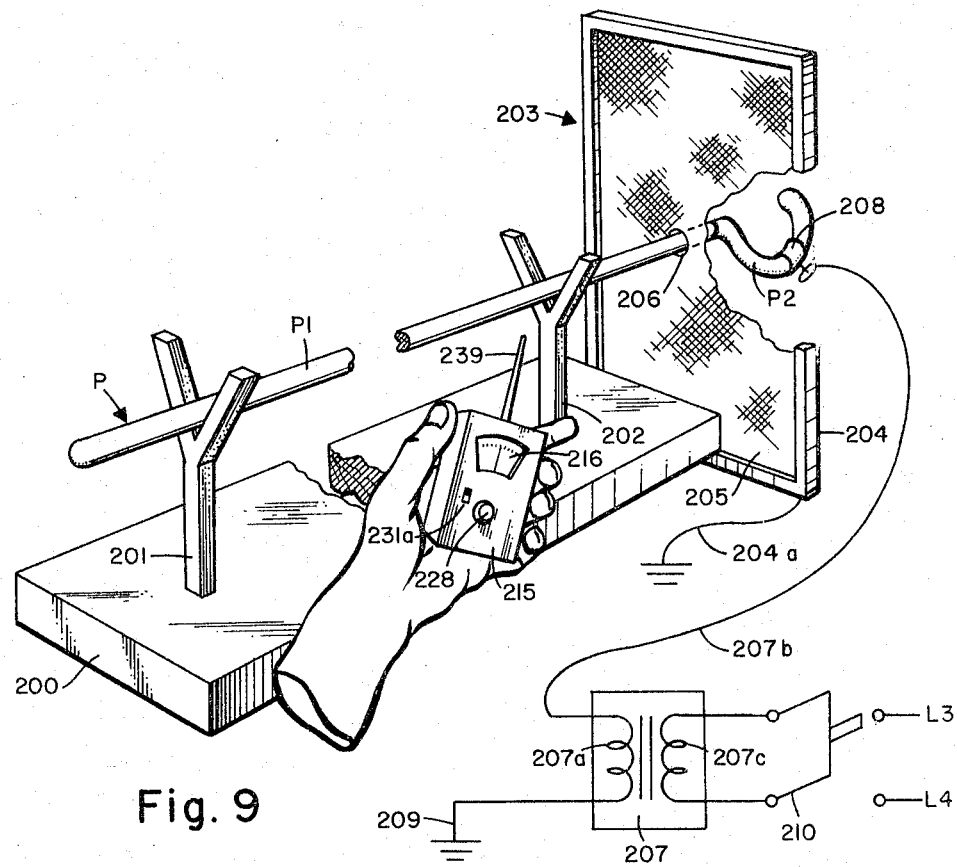
FIG. 9 is a perspective view, parkly broken away, of a disconnect pole or "hot stick" showing an apparatus for testing the insulating qualities of the pole.
Figure 10:
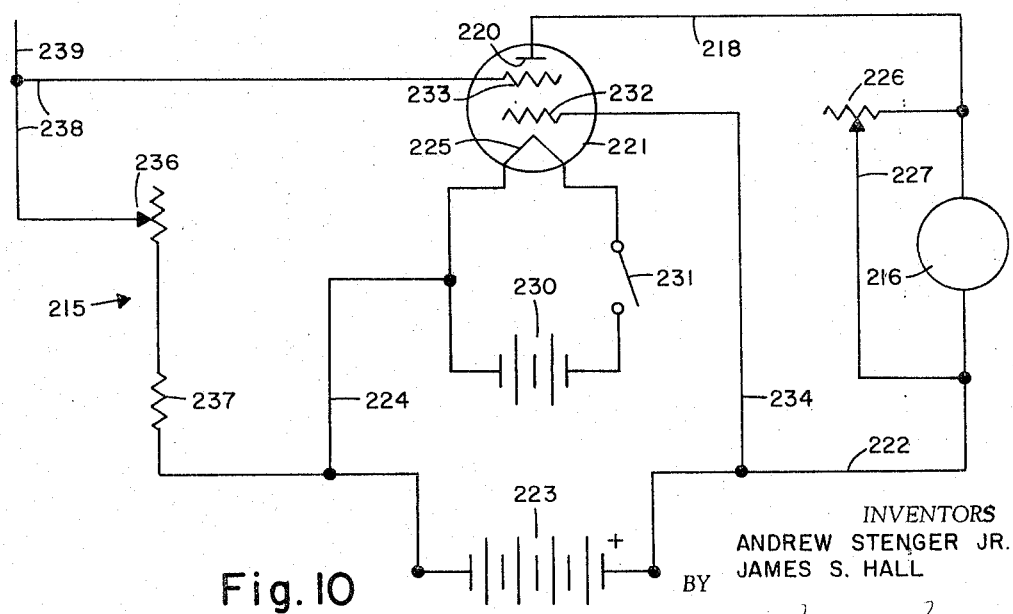
FIG. 10 is a wiring diagram of the instrument shown in FIG. 9.

It is another feature of the invention to provide a method of testing the insulating qualities of a body or member utilized for electrical insulating purposes, such as insulators and disconnect poles or "hot sticks" used by power line operators to handle switches carrying relatively high voltages such as those in the hundreds of thousands of volts. Referring to FIGS. 9 and 10 of the drawings, a method and apparatus is shown for testing the insulating qualities of a disconnect pole P which comprises an insulating handle portion P1, which is generally of wood having a metallic hook P2 at one end by which an operator can actuate high voltage carrying switching gear. Such disconnect poles are well known devices used for maintenance of electrical power equipment and systems.

In testing the insulating qualities of the handle P1, a base 200 is provided having two Y-shaped uprights 201 and 202 which have forked upper portions to receive the handle P1 resting in the forks, as shown. The base 200 and the uprights are of a suitable electrical insulating material. The end of handle P1 carrying metal hook P2 is extended outwardly from support 202 and a metal screen 203 which comprises a metallic rectangular frame 204 supporting a metallic wire mesh 205. The mesh 205 has a central opening 206 through which the pole handle P1 is extended so that the entire metallic part of hook P2 is on the right hand of the screen, as is viewed in FIG. 9. The screen frame 204 is connected to ground through a wire 204a so that the wire mesh is also grounded.

The hook P2 is then connected to a source of pulsating or alternating high voltage current such as the secondary 207a of a transformer 207, the connection being effected by a wire 207b attached to hook P2 by a suitable connector clamp 208. The opposite side of the secondary 207a is grounded at 209 and the primary 207c is connected to power source L3 and L4 through a switch 210.

When voltage is applied to hook P2, which may be in the order of 15,000 volts, an instrument 215 sensitive to pulsating magnetic fields of low intensity and of a size to be conveniently held in the hand is passed along the pole and the degree of potential present at various portions of the pole will be indicated by the needle of a milliamp meter 216 of the instrument 215.

Referring to FIG. 10, the wiring diagram of instrument 215 is shown and it comprises the meter 216 which may be of any suitable conventional milliamp meter which is connected by wire 218 to a plate 220 of an oscillator vacuum tube 221, which may be like tube 43, and the opposite side of the meter is connected by wire 222 to the positive terminal of a 67½ v. "B" battery 223. The negative terminal of battery 223 is connected by a wire 224 to cathode 225 of tube 221. Meter 216 has a shunt circuit associated therewith comprising a variable resistor 226 connected by wire 227 around the meter. By changing the resistance 226 the sensitivity of meter 216 may be varied as desired, and this may be accomplished by a knob 228 projecting from the face of the instrument 215.

Cathode 225 is energized by a suitable battery 230 and the energization is controlled by an on-off switch 231 including a control button 231a.

Tube 221 includes two biasing grids 232 and 233, the grid 232 being connected to wire 222 by wire 234 between the meter 216 and battery 223, and grid 233 is connected with wire 224 through a variable resistor 236 and resistor 237 by way of wire 238 having the resistors connected in series therein. An antenna 239 is connected in wire 238 between resistor 236 and grid 233.

The elements and circuit just described may be conveniently enclosed in a relatively small casing which can be carried in the hand of a person with adjusting knob 228 and on-off switch 231a accessible on the front of the casing, and the antenna preferably projects from one end of the casing, as shown in FIG. 9, so that it can be passed near handle P1 to pick up any magnetic flux present.

Instrument 215 can also be utilized to trace hidden lines or to indicate whether or not lines are charged with a pulsating or alternating current and also to test the insulating qualities of underground cables and the like. By adjusting the value of resistor 226, the sensitivity of the instrument can be regulated to suit the nature of the current to be detected.

Figure 11:
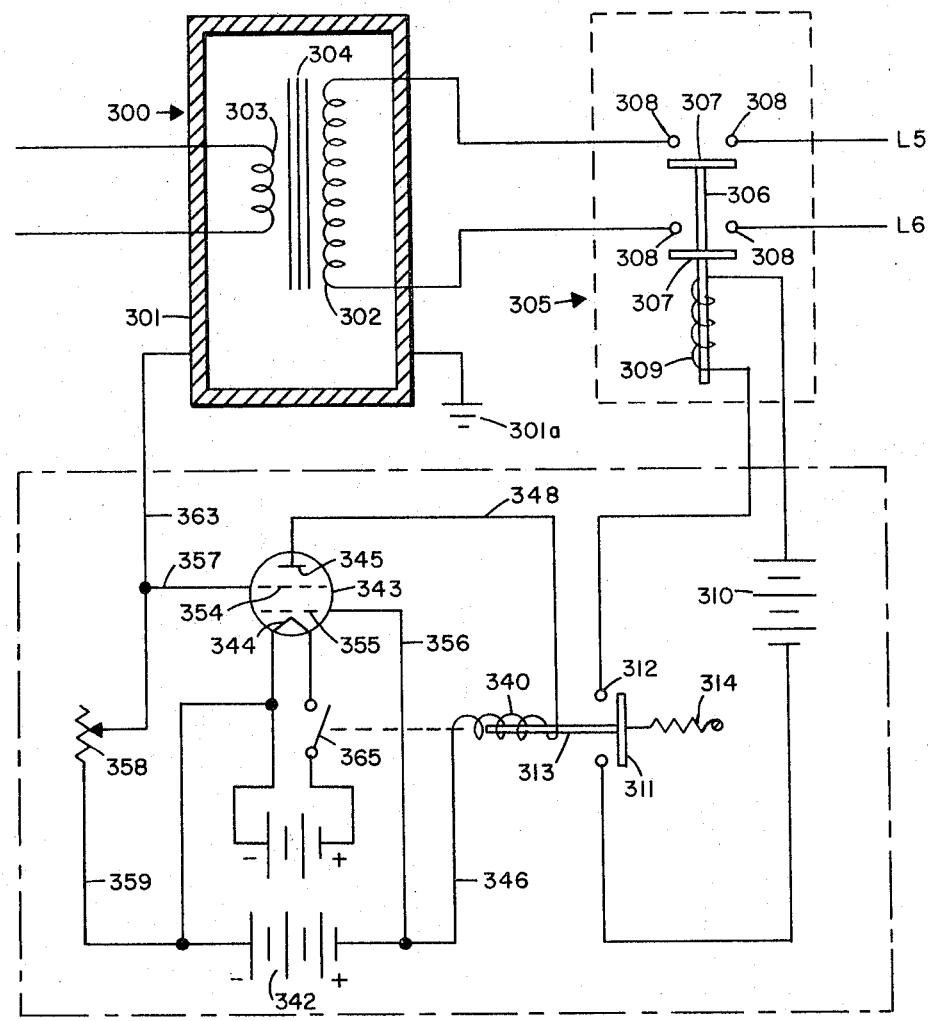
FIG. 11 is a wiring diagram showing a protective system for power transformers.

Referring to FIG. 11, a power transformer 300 is shown having the usual metal casing 301, a primary coil 302, a secondary coil 303, and a suitable core 304. The coils and core are immersed in insulating oil, not shown, and the casing is grounded at 301a, as is well known in the art. In the form of the invention illustrated, power lines L5 and L6 are controlled by a double pole contactor or circuit breaker 305 having an armature 306 carrying contacts 307 which are adapted to be maintained closed on contacts 308 as long as solenoid 309 is energized. The contactors 307 could be closed manually and retained in the closed position by energization of solenoid 309. Solenoid 309 is controlled by a circuit including a suitable battery 310 and a relay contactor 311 arranged to close on contacts 312a. Contactor 311 is carried on an armature 313 arranged to be actuated by a solenoid 340 to maintain contactor 311 closed on contacts 312 when the solenoid is energized and when the solenoid is deenergized, the contactor is moved from the contacts by a return spring 314. Preferably, any suitable means may be provided whereby contactor 311 must be manually closed and is then retained in its closed position as long as solenoid 340 is energized. The circuit for solenoid 340 is similar to that of solenoid 40 disclosed in the instrument shown in FIG. 4 and to avoid unnecessary repetition the elements or parts of this circuit which are like corresponding parts of the circuit for solenoid 40 in FIG. 4 are referred to by the same reference characters raised by 300. It will be seen that the power for solenoid 340 is from the negative terminal of battery 342 to cathode 344 of tube 343, plate 345, wire 348, solenoid 340, wire 346 to the positive terminal of the battery. Grid 354 is connected by wires 357 and 363 to a connection with the transformer casing 301, and the grid circuit includes variable resistor 358, wire 359 to the negative terminal of battery 342. Grid 355 is connected by wire 356 to wire 346. Normally a slight magnetic flux will flow through the casing 301 to ground and it could cause the amplifying device to operate circuit breaker 305 to the opened position. However, the value of the variable resistor 358 is such that it can be adjusted so that this breaker operation does not occur except upon an increase in the frequency of the magnetic flux in the casing occasioned by arcing inside the casing, such as occurs in the event the insulation within the transformer commences to breakdown, which increase in frequency biases the grid circuit negatively and causes operation of the circuit breaker to the open position thereby shutting down the transformer before a destructive short circuit develops. It will be seen that grid 354 will be biased by an exceedingly slight potential or current flow through the material of the casing 301 to interrupt the current flow through solenoid 340.

A switch 365 is provided in the heating circuit for cathode 344 and this switch is linked with the armature for contactor 311 so that when the armature shifts to move the contactor to its circuit breaking position the heater circuit for the cathode is broken. Likewise, switch 365 may be closed at the time contactor 311 is closed.

Assuming that contactors 307 and 311 are closed on their respective contacts and switch 365 is closed, if no potential is present in the transformer casing, current will flow through the circuit for solenoid 340 holding the circuit for solenoid 309 closed so that contacts 307 will be held to contacts 308 to maintain the primary transformer coil circuit. In the event the slightest pulsating electrical voltage or potential appears in the casing 301, as will occur by a slight breakdown of the insulating quality of the insulating oil permitting current to leak to the casing, grid 354 will be biased to cause interruption of current flow through solenoid 340 resulting in opening of the contacts 311 and 312, breaking the circuit to solenoid 309 which opens contacts 307 and 308, thereby preventing a damaging short circuiting of the transformer, which would certainly occur if the transformer remained in operation.

While we have described but several forms of the invention, it is to be understood that other forms, modifications, and adaptations could be made, all falling within the scope of the claims which follow.

We claim:

1. An automatic grounding devices comprising a metallic member, support means for retaining said member in a non-grounding position and for guiding said member for movement to a grounding position, means to attach said support means to a vehicle, means operable to propel said member from its non-grounding to grounding position, means responsive to an alternating magnetic flux field to render the last mentioned means operable, and means forming an electric connection between said grounding member and the vehicle to which said support means is attached.

2. In combination with a vehicle, an automatic grounding device comprising a tubular member open at one end, means supporting said member on the vehicle, a metallic rod slideably positionable in said member and longitudinally movable therein, said tubular member being disposed to direct said rod downwardly toward the ground on which the vehicle rests, spring means urging said rod outwardly of said member, latch means to retain said rod in said member against the bias of said spring, and amplifying means responsive to a magnetic flux field adjacent said vehicle to operate said latch means to release said rod.

3. In a sensing apparatus of the character described, an electric current responsive device, a circuit for said device including an amplifying unit, said unit having an input and an output and a pair of biasing elements affecting flow of electrical current between said input and output, a power source in said circuit between said device and input, one of said biasing elements being connected to said circuit between said device and said power source, a biasing circuit for the other of said elements including a connection with the first mentioned circuit between said power source and input, a resistance means in said biasing circuit, an antenna member connected in said biasing circuit between said resistance and said other biasing element and control means operable by said device in response to a predetermined energization of said device.

4. In a sensing apparatus of the character defined in claim 3 in which said amplifying unit comprises a vacuum tube including a cathode comprising an input and a plate comprising the output, and a pair of grids interposed between the cathode and plate forming said pair of biasing elements.

5. The steps in the method of testing electric current leakage in an insulating member having a metallic part thereon comprising supporting said member by insulating means, placing a metallic mesh screen around said member in a plane extending radially of said member and intersecting said member adjacent to said metallic part, grounding said screen, electrically connecting said metallic part with a high voltage source of electric current and placing a relatively sensitive magnetic field indicator in current sensing relationship to the portion of said member on the side of said screen opposite the side adjacent to said metallic part.

6. The steps defined in claim 5 in which said indicator comprises a meter responsive to electric current flow, a circuit for said meter including an amplifying unit, said unit having an input and an output and a pair of biasing elements effecting flow of electrical current between said input and output, a power source in said circuit between said device and input, one of said biasing elements being connected to said circuit between said bias and said power source, a biasing circuit for the other of said elements including a connection with the first mentioned circuit between said power source and input, a variable resistance in said biasing circuit, and an antenna member connected in said biasing circuit between said resistance and said other biasing element.

7. In combination with the vehicle having a boom-like structure thereon, an electrical grounding device on said vehicle including a conductor member normally supported on the ground on which the the vehicle is supported, said conductor member being adapted to engage the ground to form an electrical connection between the vehicle and the ground, an electrically controlled means operable to move said conductor into engagement with the ground, said electrically controlled means including an amplifier responsive to a magnetic field adjacent said boom to render said control means operable.

References Cited by the Examiner

UNITED STATES PATENTS

| | | |
|---|---|---|
| 1,576,228 | 3/1926 | Schmieze. |
| 1,838,664 | 12/1931 | Dubilier. |
| 2,114,687 | 4/1938 | Schmitt. |
| 2,502,496 | 4/1950 | Wickman. |
| 2,615,969 | 10/1952 | Albrecht. |
| 2,730,245 | 1/1956 | Auld. |
| 2,789,282 | 4/1957 | Winters. |
| 3,125,751 | 3/1964 | Winters. |
| 3,168,729 | 2/1965 | Volberg. |
| 3,201,775 | 8/1965 | Pederson. |

FOREIGN PATENTS

| | | |
|---|---|---|
| 2,236,500 | 8/1960 | Australia. |
| 474,090 | 5/1951 | Canada. |
| 405,614 | 7/1931 | Great Britain. |

MILTON O. HIRSHFIELD, *Primary Examiner.*

SAMUEL BERNSTEIN, *Examiner.*

R. V. LUPO, *Assistant Examiner.*